June 29, 1965 P. MURRLÉ 3,192,329

DOUBLE POLE, DOUBLE THROW SWITCHING DEVICE WITH OSCILLATING CONTACT STRUCTURE AND CAMMING MEANS

Filed Dec. 20, 1962 5 Sheets-Sheet 1

Pierre Murrlé, Inventor

By Wenderoth, Lind and Ponack, Attorneys

Pierre Murrlé
Inventor
By Wenderoth, Lind and Ponack, attorneys

Pierre Murrlé
Inventor
By Wenderoth, Lind and Ponack, Attorneys

Pierre Murrlé
Inventor
By Wenderoth, Lind and Ponack, attorneys

Pierre Murrlé
Inventor

By Wenderoth, Lind
and Ponack,
Attorneys

United States Patent Office 3,192,329

Patented June 29, 1965

3,192,329

DOUBLE POLE, DOUBLE THROW SWITCHING DEVICE WITH OSCILLATING CONTACT STRUCTURE AND CAMMING MEANS

Pierre Murrlé, Beausoleil, France, assignor to Europe Manufacturing Trust Reg., Vaduz, Liechtenstein Filed Dec. 20, 1962, Ser. No. 246,042

Claims priority, application France, Dec. 21, 1961, 882,704, Patent 1,320,762; May 28, 1962, 898,954, Patent 1,332,034; Sept. 21, 1962, 910,108, Patent 82,364; Sept. 27, 1962, 910,597, Patent 82,382

11 Claims. (Cl. 200—16)

This invention relates to electrical switching means, more especially reversing switches, of the type including one or more movable contact members engageable with stationary contacts. The movable contact members have usually been provided in the form of resiliently flexible metallic strips fixedly secured at one end to a post or the like, and deformable normally to the general plane of the strip away from a neutral undeflected position to engage stationary contacts positioned to either side of said neutral position of the movable contact strip.

The repeated opposite flexures to which such a contact strip is subjected in use over many thousands or millions of operating cycles generates internal stresses which are liable to cause premature breakage. To keep the stresses in the metal within acceptable bounds consistent with a reasonably long service life of the switching device, has imposed a minimum limit on the length of the contact strip, an objectionable limitation in many types of miniaturized equipment.

It has been attempted to avoid these difficulties by providing the movable contact member in such switching devices in the form of a pivoted strip element which swings or rocks bodily between its contact making positions about a pivot, in the general plane of the strip element, without substantial deformation of the member in flexion. However, such constructions have heretofore generally required the movable contact member to be provided with riveted or other type of pivotal mounting which is relatively complicated and expensive to make, is in itself a source of premature failure, and furthermore requires the provision of flexible conductor means for electrical connection of the movable member with the fixed structure of the device.

It is a basic object of this invention to provide a novel type of movable contact member which will be entirely free from the above enumerated disadvantages of both types of prior movable contacts while combining the advantages of both. It is accordingly an object hereof to provide a movable switch contact member, and mounting means therefor, wherein the contact member, in the form of a generally flat strip or plate, will be movable between its opposite positions, through displacement normal to the general plane of the plate, but wherein such displacement will not subject the plate to any degree of flexional deformation substantially through the full extent of its angular displacement. It is a correlated object to provide a movable switch contact member and mounting means thereof, wherein the member will in effect be pivoted between its opposite positions as a result of a pure rotational, or rocking, as contrasted with flexional, movement, without there being any necessity to provide any actual pivot structure for the member with its attendant disadvantages. A related object is to permit a substantial relative increase in the spacing between the opposite stationary contacts of a reverser switch.

In attaining the above and further objects that will appear, there is provided according to a preferred embodiment of the invention a movable contact member in the form of a generally flat strip or plate having movable contacts attached to sides thereof, and means mounting said plate for bodily sideways rocking movement about an axis essentially contained in the general plane of said plate, said mounting means comprising a base, at least one slot formed in said base and a portion of said plate projecting into said slot; said slot is formed with a restricted region receiving said plate portion with relatively low clearance therein, and side surfaces tapering away from said restricted region so as to define clearance space for the angular rocking movement of said plate over a relatively wide arc. It will be appreciated that with such a construction, the plate while rocking normally to its general plane will not be subjected to substantially any flexional constraint from the mounting means over essentially the full angular extent of its rocking movement.

In prior art switching devices of the type including cam-actuated double-pole double-throw switches, double reverser switches, and the like, it has usually been necessary to provide some type of guiding means for supporting the movable contact members, and/or means for converting the rotational movement of the cam into a normal displacement of the contact members. It is an object of this invention to eliminate this requirement and also to simplify the construction of such cam-actuated dual switching devices in yet other ways, and it will be shown that the basic inventive concept defined above makes it possible to accomplish these objects in an especially advantageous way.

Further objects of the invention relate to the provision of improved multi-stage switching assemblies, of a type useful in the performance of cyclic, programmed control functions in relation to various types of automatic and semi-automatic equipment. In the ensuing disclosure of exemplary embodiments of the invention, various advantages of those embodiments over the prior art will be indicated passim, and it is to be understood that the attainment of all such advantages constitute as many specific objects of the present invention. In the accompanying drawings.

Figure 1:
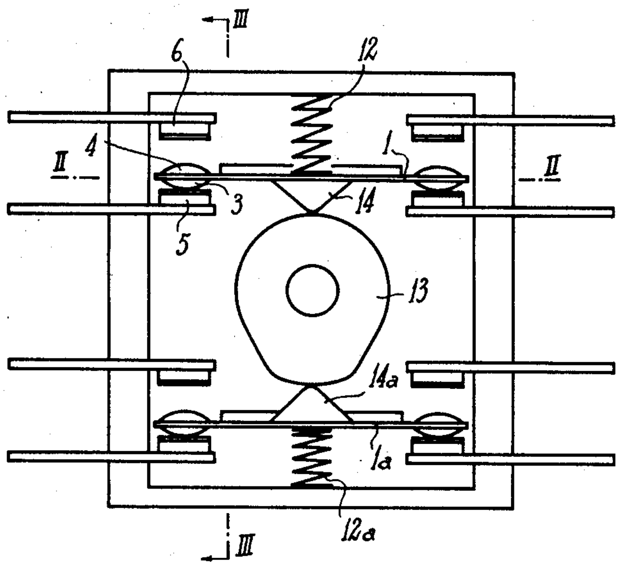
FIG. 1 is a plan view of a double reverser switch device according to a basic form of embodiment of the invention.
Figure 2:
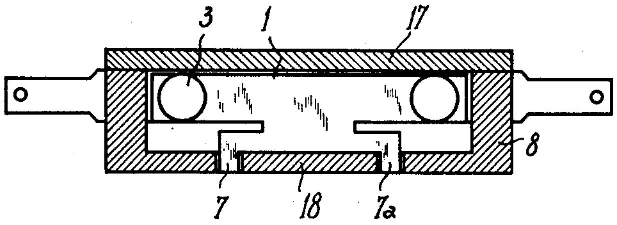
FIG. 2 is a section on line II—II of FIG. 1.
Figure 3:
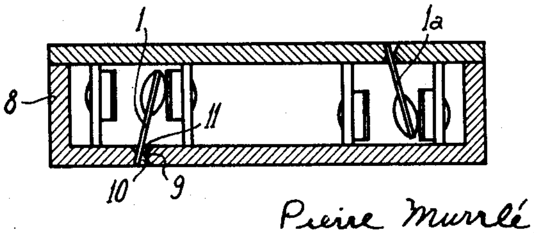
FIG. 3 is a section on line III—III of FIG. 1.

Referring to the embodiment of the invention shown in FIGS. 1 to 3, the double reverser switch there shown comprises a generally flat rectangular casing 8 having a bottom wall 18 and a cover 17. Positioned within the casing are a pair of movable contact members in the form of plates or strips 1 and 1$^a$ extending in parallel spaced planes normal to the planes of said bottom wall and cover and parallel to a pair of opposite side walls of the casing. Each strip 1 or $1^a$ has a pair of elements such as 3 and 4 secured to each of its opposite sides at each end of it. The contact elements 3 and 4 at each end of each strip are adapted to cooperate with stationary contact elements, 5 and 6 respectively, formed on stationary contact strips extending into the casing 8 through slots in the side walls thereof and adapted for connection to a utilization circuit, not shown, externally of the casing. In accordance with the invention, the means for mounting the movable contact members in the casing to permit the lateral shifting or rocking movements thereof are constructed as follows.

Referring especially to FIG. 2, each contact plate such as 1, is formed integrally, preferably as a single stamping, with a pair of mounting lugs 7 and 7*a*, which extend in the general plan of the plate and project in a common direction normal to the longitudinal dimension of the plate 1 or $1^a$ and away therefrom. Preferably the lugs 7 and 7*a* connect with the main body of plate 1 (or $1^a$) by way of a portion of reduced width as shown, though this is not essential. The lugs 7 and 7*a* of the plate 1 extend into slots such as 9 formed in the bottom wall 18 of the casing, while the lugs 7, 7*a* of the other plate member $1^a$ similarly extend into similar slots formed in the cover member 17 of the casing. The preferred configuration for the slots such as 10 is apparent from FIG. 3, where each such slot, in cross section on a plane normal to the main lengthwise dimension of the plate, is seen to possess side walls 10 and 11 diverging oppositely away from a restricted throat portion of the slot. The width of this restricted throat region is just wide enough to accommodate the width dimension of the lugs 7, 7*a* with reasonably small clearance, while the diverging wall portions 10, 11 permit sidewise pivotal movement of said lugs 7, 7*a* and therewith the entire plate 1 (or $1^a$) between their opposite circuit positions in which the contacts 3, 5 and 4, 6 are respectively made and broken. The straight bottom edge area of the plate between lugs 7 and 7*a* engages the plate upper surface of bottom wall 18 to provide an abutment thereat.

For simultaneously shifting both movable contact members between their reverse positions, there is provided a cam 13 mounted between the movable contact members on a pivot shaft journalled in the bottom wall of the casing, and adapted to engage simultaneously, at diametrically opposite points of its periphery, pusher elements 14 and 14*a* secured centrally of the plates 1 and $1^a$ on the inwardly facing sides of them. Compression springs 12 and 12*a* acting on the opposite or outer sides of the plates 1 and $1^a$ serve to apply both plates against the cam.

It will be noted that the improved mounting means disclosed above as including the lugs 7, 7*a*, and the slots such as 9, exhibit a number of important advantages over conventional constructions, in which the movable contact members of a switching device are usually either secured at a point to a supporting post so as to flex resiliently in one or the other sense from a central undeformed position, outwardly of the general plane of the contact strip, or are pivoted on a pivot to rock thereabout within the general plane of the strip. In the first case the repeated flexing of the strip in reverse directions generates internal strains which may lead to premature breakage especially in the case of relatively short movable contact strips as are frequently required due to space limitations in miniature equipment and the like. In the second case there is the additional drawback of having to provide flexible connections with the pivot post. The free pivotal mounting means described eliminate such drawbacks while at the same time greatly facilitating fabrication and assembly since all riveting, soldering and similar attachment processes are eliminated. At the same time, the relative spacing between the opposed fixed contact elements of the switch can be considerably increased without special precautions, since the diverging wall configuration of the mounting slots such as 9 in cross section, makes it possible to achieve comparatively large shifting angles for the plate in a very simple manner. Furthermore, whereas the actual shift of the plate between its opposite positions is effected in a positive manner, substantially without any flexing of the plate liable to generate abnormal strains therein, the full flexibility of the plate remains available at each end of its shifting stroke for providing the requisite contact pressure, thereby ensuring excellent electrical contact as well as a balanced distribution of pressures as between the various contacts. This is especially true since in each of its end positions wherein the plate is retained by the force of the cam 13 or the opposing spring such as 12, there is a relative degree of independency between the two contacts areas at the respective ends of the plate, owing to the resiliency of the plate coupled with the fact that there is no constraint on any part of the plate outside the linear areas of engagement at the walls of the mounting slots.

Moreover, especially in the case of the double reversing arrangement shown, the invention has the added advantage of eliminating the need for any guiding means or the like for supporting the movable contact member between its end positions, or leverage for converting the pivotal motion of the member into perpendicular displacement. It may moreover be noted that the arrangement shown above does not require the use of two opposing springs acting on opposite sides of each contact member, or conversely two strips with a spring acting between them, as is generally required in conventional DPDT or the like switch devices of this general character; this results in a saving of space. The attainment of the above advantages and results with the use of a substantially rigid movable contact member has not been feasible with conventional systems.

Figure 4:
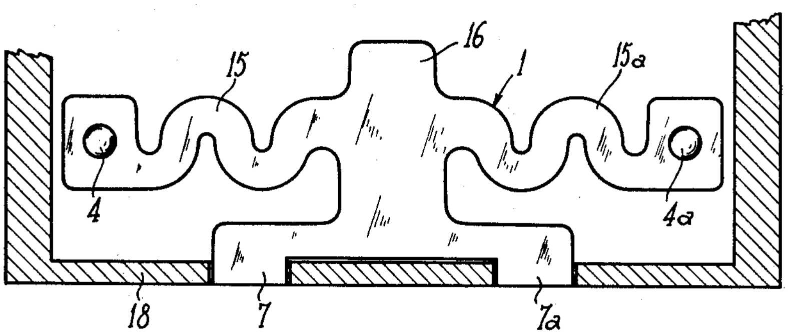
FIGS. 4 and 5 are a view in sectional elevation and plan, respectively of a modified movable contact member usable in the device of FIG. 1.
Figure 5:
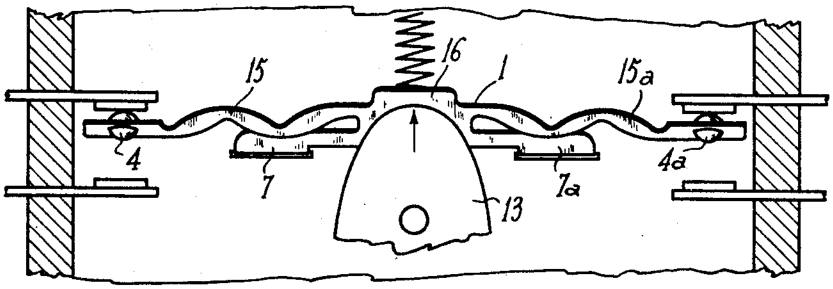

The modified embodiment shown in FIGS. 4 and 5 differs from the one described in that the movable contact strip or plate such as 1 is formed with undulations such as 15, 15*a*, in the plane of the plate, between its central, cam-engaging area and its ends carrying the contacts such as 14, 14*a*; moreover, as will be seen from FIG. 5, the plate has corrugations impressed in it normally to its plane. These provisions serve to improve the flexibility of the strip while retaining the advantages of the invention described in connection with the first embodiment. Another difference shown in FIGS. 4–5 is that the strip is provided in its central portion with an upward projection 16 for engagement by the cam such as 13, or by an intermediate pusher member as will be described with reference to further embodiments.

Figure 6:
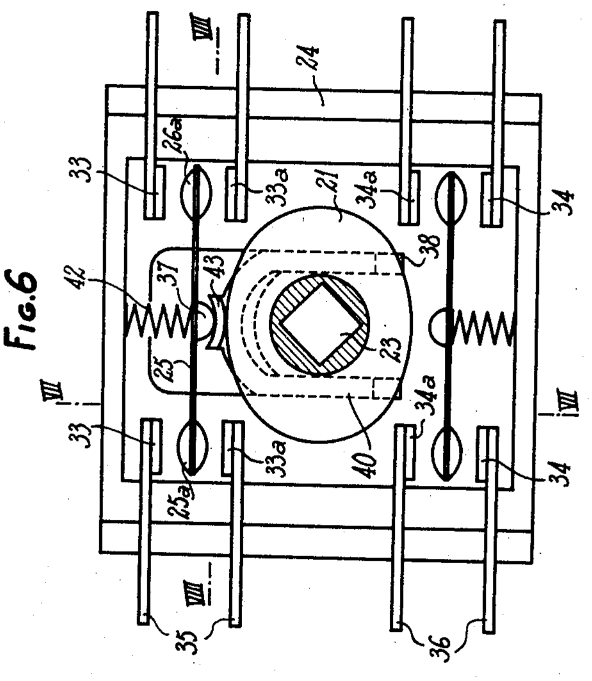
FIG. 6 is a plan view of another form of double reverser switch device according to the invention.
Figure 8:
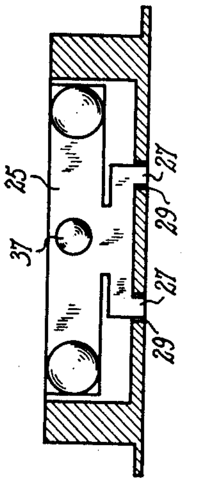
FIG. 8 is a section on line VIII—VIII of FIG. 6.
Figure 7:
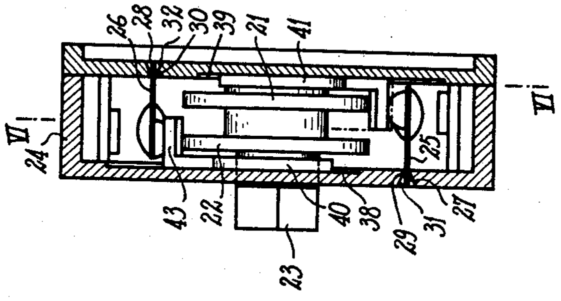
FIG. 7 is a section on line VII—VII of FIG. 6.
Figure 6A:
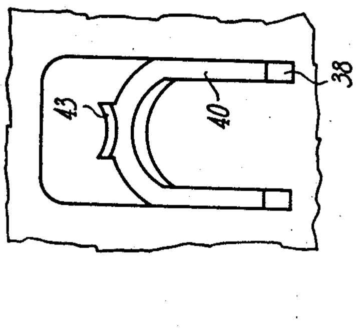
FIG. 6*a* a corresponding detail view.

In the embodiment of the invention shown in FIGS. 6–8, the general arrangement is the same as in FIGS. 1–3, and includes the flat rectangular casing 24, the pair of movable contact members 25 pivotally mounted in the bottom and top walls of the casing by way of projecting lugs 27 and 28 of said members extending into mounting slots 29 and 30 in said walls; in this instance the slots are V-shaped in cross section rather than X-shaped as was shown in FIG. 3; that is, each slot such as 30 (see FIG. 7) has a pair of straight side walls 31, 32 diverging from the restricted upper side of the slot in which the lug 27 or 28 is engaged with minimum clearance; it will be clear that the effect is equivalent to that of the mounting arrangement of FIGS. 1–3. As in the first embodiment, the contact elements 25*a*, 26*a* provided at the opposite ends of each movable contact plate on each face thereof cooperate with fixed contact elements such as 33, 33*a* and 34, 34*a* provided on stationary contact strips 35 and 36 extending through the side walls of the casing.

In contrast to the embodiments first described, the device of FIGS. 6–8 includes two separate cams 21, 22 for actuating the respective movable contact members. Both cams 21 and 22 are coaxially secured on a common actuating shaft 23 journalled in a wall of the casing 24. In this embodiment moreover the cams do not act directly upon the related contact members but act through interposed pusher members 40 and 41 respectively. Members 40 and 41 are each in the form of a U with its legs slidable in parallel spaced grooves formed in the bottom and top walls of the casing 24, the direction of this sliding displacement being normal to the planes of the plates 25. Each member 40, 41 has a concave socket 43 formed centrally of its cross-leg part with the concavity of the socket being directed towards the related movable contact plate 25 and being engageable by a convex knob 37 projecting from the midpoint of the plate. A compression spring 42 acts on the opposite side of each plate 25 in opposition to the camming action applied thereto.

In operation, it will be readily understood that rotation of shaft 23, e.g. by way of a square end-piece as shown, rotates both cams 21, 22. The periphery of each cam acts upon the inner surface of the socket member 43 of the related pusher member 40, 41, thereby imparting linear displacements to both pusher members in their grooves. Thus the camming force is transmitted to the knobs 37 of the movable contact members 25 in a purely normal direction, without any tangential component as is the case where a rotatable cam is made to engage the movable contact member directly. This not only minimizes wear on the cam, an important consideration especially in the case of cams made of dielectric materials sensitive to heating by Joule effect, but it further ensures heightened accuracy in the control of the displacement of the movable contact members, and hence the synchronous opening and closure of both contacts by each member.

Figure 9:
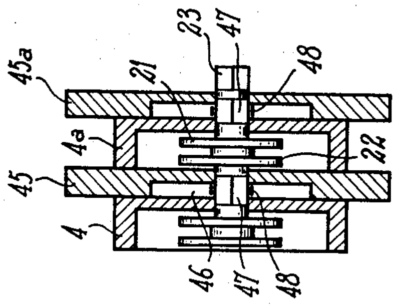
FIG. 9 is a longitudinal sectional view of part of a stacked assembly of switching devices constituting a multi-stage switch system according to an aspect of the invention.

Dual switching devices according to the invention, while useful per se in many applications, are of especial advantage when used as components in multi-stage cyclic control switch assemblies, e.g. motor-driven, of the type widely employed in cyclic programmed control of various automatic machinery, e.g. machine-tools, washing-machines, neon signs, and other appliances. The invention accordingly in an important aspect contemplates such a multi-stage control switch assembly comprising a stack of switching units of the kind described earlier herein. Thus, FIG. 9 partially illustrates such a multi-stage switch assembly including two units each of which may be similar, for example, to the device described with reference to FIGS. 6–8. The flat rectangular casings 24–**24*a* of two such units are shown stacked, with a separator plate 45, 45*a*, made of insulating material, being interposed between each pair of adjacent casings. The actuating shafts such as 23 of the respective devices are telescopically or otherwise axially interconnected to provide a common actuator shaft 23 extending through central apertures in the separators 45, 45*a* the full length of the multi-stage switch device. In a multi-stage cyclic programming switch of the general type contemplated, it is required that with each switching stage means be provided for separately setting the switch actuating cam or cams of the particular stage in accordance with the over-all cyclic control program. In accordance with a preferred embodiment of the invention in this aspect, such setting means are received in a recess such as 46 formed within the separator member such as 45** adjacent each switching stage. The cam setting means may assume various forms, a few of which will be described with reference to FIGS. 10–15.

Figure 10:
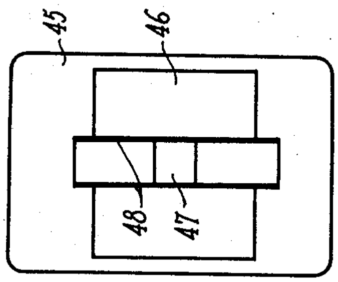

In the construction of FIG. 10, the setting means comprise a square 47 mounted on the common shafting 23 of the multi-stage switch within the recess 46, and a pair of flat leaf springs 48 having their ends abutted against shoulders of said recess and their mid-portions engaging opposite sides of the square.

Figure 11:
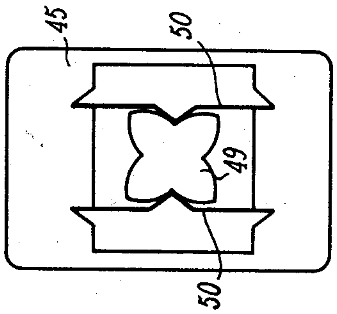

In the construction of FIG. 11, instead of a square a four-lobed star-shaped cam member 49 is mounted on the shaft in recess 46, and the leaf springs 50, mounted in the same manner as the leaf springs in FIG. 10, are distorted in opposite directions in their mid-regions so as to provide projections resiliently engageable with opposite notches defined between adjacent lobes of the star.

Figure 12:
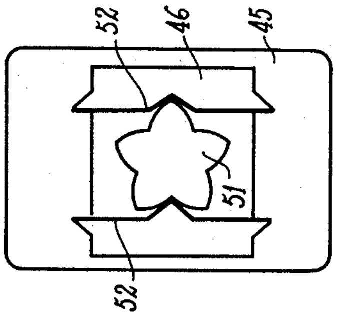
FIGS. 10–15 show various forms of setting mechanisms usable in connection with each stage of such a multi-stage assembly.
Figure 15:
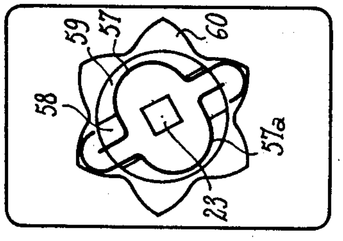

In FIG. 12, a five-lobed star 51 is used, and the leaf springs 52 are deformed in a common direction at their mid-regions, so that the one leaf spring defines a projection cooperating with a notch between lobes of the star, while the opposite leaf spring defines a notch cooperating with the apex of the oppositely projecting lobe, thereby providing five different settings for the cam actuating the switching stage.

Figure 13:
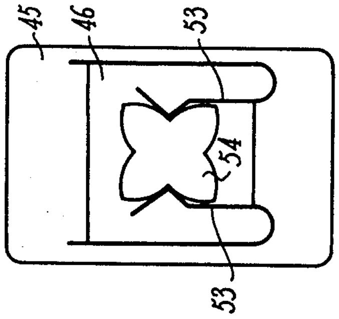

In FIG. 13, a four-lobed star 54 is used as in FIG. 11; however the leaf springs 53 in this case are U-shaped, having only one of their ends retained by a shoulder of the recess 46 while their free end is deformed to cooperate with the interlobe notches of the star, thereby imparting greater flexibility and operating smoothness.

Figure 14:
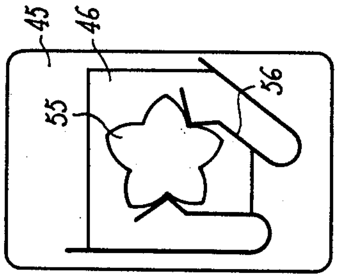

In FIG. 14, the construction may be regarded as a combination of FIGS. 12 and 13, in that a five-lobed star 55 is used, while the leaf springs 56 are U-shaped as in FIG. 13. Whereas as shown in FIG. 14 the free ends of both leaf springs are deformed in opposite directions (as in FIG. 11 or 13) to cooperate with interlobe notches of the star, thereby requiring the springs to be pointed in angled relationship, it will be evident that said springs may be deformed in a common direction as in FIG. 12, and mounted in parallel relation.

It will be obvious that a great variety of other combinations may be conceived on the basis of the examples shown in FIGS. 10–14. The cam-setting arrangement shown in FIG. 15 differs from the foregoing ones in that in this case the spring means are carried by the shaft 23 whereas the camming means are integral with the walls of the recess 46 in the separator member. Specifically, the shaft 23 has a supporting member 59 secured to it within recess 46, the member 59 being formed with a recess 58 in one of its faces. Mounted within the recess are a pair of leaf springs 57 and **57*a*, which have arcuate mid-portions conforming with the arcuate surfaces of opposite wall portions of the recess 58 and diametrically opposed arcuately-bent end portions protruding radially beyond the periphery of member 59, so as to cooperate with opposite notches of the star-shaped wall 60 with which the recess 46** of the separator member is integrally formed, as by molding. An advantage of this last arrangement is that the radius of the cooperating setting means (i.e. leaf springs and multi-lobed camming contour) is increased to a maximum, thereby ensuring more positive and yet smoother setting operations.

Figure 16:
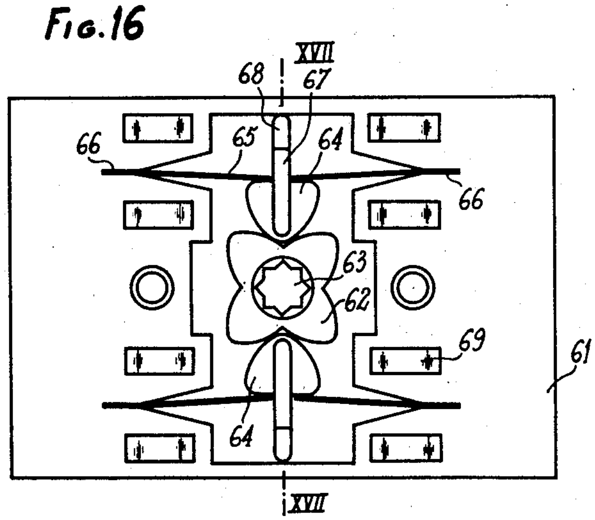
FIG. 16 is a plan view of another form of setting mechanism.
Figure 17:
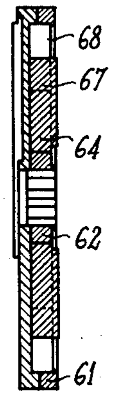
FIG. 17 is a section on XVII—XVII, FIG. 16.
Figure 18:
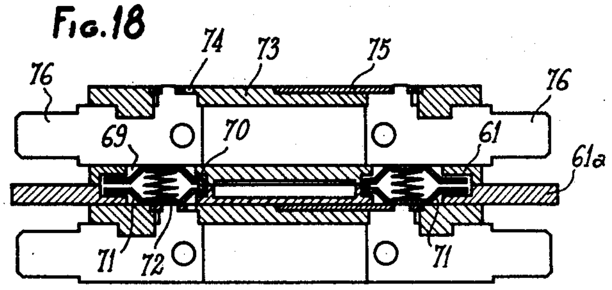
FIG. 18 is a sectional view of two stages of a multi-stage assembly.

FIGS. 16–18 illustrate a more elaborate form of cam setting device usable with a switching stage of the multi-stage switching assembly. The general layout is similar to that shown in FIG. 11, there being a four-lobed star member 62 splined on the shafting 63 of the switching assembly within a recess formed in the insulating separator member 61, and two opposed leaf springs 65 having their ends 66 retained in member 61. However, the leaf springs rather than acting on the star member 62 directly as in FIG. 11, act by way of interposed pusher members 64, which are heart-shaped, and have their apices directed inwardly into engagement with opposite interlobe notches of star member 62. The flat outer sides of the heart-shaped pusher members 64 are engaged by the mid-portions of the leaf springs 65. The pusher members 64 are guided in their movements radially to the shaft 63 by means of guide vanes 67 (also see FIG. 17) slidable in grooves 68 formed in the separator member 61. It will be noted that as the pusher members 64 are cammed by star member 62 to their radially outermost positions, the leaf springs snap to an inwardly concave condition in which they engage the rounded corners of the heart-shaped pusher members 64.

The multi-stage switching assemblies provided with improved cam setting means, as described with reference to FIGS. 9–17 above, have a number of advantages. It will be understood that the number of stages in such an assembly, as well as the settings in each stage may frequently require modification according to varying programming requirements. The biassing force exerted by the resilient setting device should in every case be proportioned to the number of switching stages present. In prior multi-switch systems of this kind, this object has sometimes been achieved by associating the setting mechanism directly with the switch contacts governed thereby; this an undesirable approach since it is always best to provide a clear demarcation between the mechanical and electrical components for optimum performance and ease in maintenance. In some prior arrangements accordingly the setting mechanism has been separately housed in a special compartment separated from the related switching stage by a separating wall; this is a cumbersome, space-consuming solution. By housing the setting mechanism in a recess formed in the insulating separator which is normally provided between the switching stages to ensure a minimum leakage path between them in accordance with safety regulations, the invention achieves the desirable separation between the electrical and mechanical components of the system without increasing longitudinal space requirements, while at the same time facilitating the afore-mentioned proportioning of the biasing force in the setting mechanism for each stage, as by simply replacing the leaf springs. The setting members, in the form of multi-lobed stars or polygonal members can also be readily substituted when required. The entire setting mechanism is positive and reliable in action while including a minimum of simple inexpensive parts readily installed and replaced. The use of leaf springs is especially desirable because of their large deformation-tolerating capacity.

Figure 19:
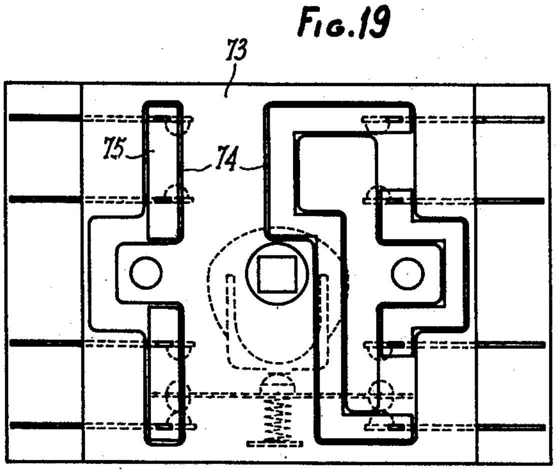
FIG. 19 is a plan view of a casing wall opposed to the separator member.

In the embodiment of a multi-stage switching assembly according to the invention, illustrated in FIGS. 18–19, the separator member provided between the casings of adjacent switching stages (two of which stages are shown in FIG. 18) is in two interengaging parts 61 and 61*a* formed with registering side openings 69 defining shoulders 70. Received within the openings 69 so as to be clamped on either side by the shoulders 70 thereof, are contact members 71 in the form of channel-shaped conductive strips 71 containing springs 72 therein acting to press the side flanges of the contact members outwards and into clamping engagement with the shoulders 70. The plate members 61 and 61*a* are formed in the area between the openings 69 with complementary recesses adapted to receive therein a cam setting mechanism which may be of a type described with reference to any of the previous figures, e.g. FIGS. 16–17. The separator member composed of both plates 61, 61*a*, complete with the spring-pressed contacts 71–72 and the separator mechanism mounted therebetween is adapted to be inserted bodily between a pair of switching stage casings as shown in FIG. 18, any suitable means, not shown, being provided for maintaining the structure in assembled relationship. Thus it will be seen that there is provided according to this aspect of the invention, in a multi-stage switching assembly, an improved structure according to which the separator members which are normally required to be inserted between adjacent switching stages in order to increase the length of the leakage paths therebetween beyond a prescribed minimum, constitute autonomous, individually replaceable units including all the electrical interconnections required between each of the switching stages and the adjacent stage, as well as the separate cam setting mechanism for the switching stage.

As illustrated in FIGS. 18 and 19, in accordance with a preferred embodiment of this aspect of the invention, each casing stage comprises in additon to the associated two-part separator unit 61–61*a* just described and which may form one wall of the stage, an opposite wall 73 which is formed with molded grooves 75 in its outer surface remote from that facing the separator member, in which conductor strips 75 are imbedded, providing the requisite connections between the switch contacts. The output terminals 76 of the switching stage, which may form extensions of the stationary contact members of the switching stage as explained with reference to previous embodiments, are clamped between the opposite walls 61–73 of the switching stage in contact engagement with the conductor strips 75.

It will be seen that the multi-stage switching assembly constructed as described with especial reference to FIGS. 18 and 19, is highly advantageous in that it employs a small number of readily standardized, parts of simple form, is easy to assemble and dismantle, can be built up to any desired length, depending on the number of stages required, without proportionate increase in cost, and enables each stage to be easily set independently of the remaining stages both in regard to the settings of the switch contact actuating cams and the force of the biassing springs.

It will be apparent that many modifications may be made in the structures illustrated and described without exceeding the scope of the invention, and features of the various embodiments disclosed may be combined in a variety of combinations other than those shown. Thus, while it is contemplated according to a preferred embodiment of the invention that in the multi-stage switch assembly in accordance with any of the examplary constructions shown in FIGS. 9–19, each switching stage employs one or more movable contact members in the form of plates mounted for sideways rocking movement in slots as disclosed with reference to FIGS. 1–8, various features of said multi-stage assembly as illustrated in FIGS. 9–19 may be advantageously used independently of such construction of the movable contact members. As another possible modification lying within the scope of the invention, it should be noted that in the multi-stage switch construction described each switching stage may advantageously comprise printed-circuit cards replacing partly or in whole the construction shown in FIGS. 18–19. Other variations will occur to those familiar with the art.

What I claim is:

1. In a switch assembly, stationary contact means, a movable contact member in the form of a generally flat plate having movable contact means attached to at least one side thereof, means mounting said plate for bodily sideways rocking movement about an axis essentially contained in the general plane of said plate, for engagement and disengagement of said movable contact means with said stationary contact means, said mounting means comprising surfaces defining linear areas of engagement on opposite faces of said plate substantially along said rocking axis and clearance areas above and below each of said linear areas of engagement, whereby said plate is not subjected to any constraint in flexion from said mounting means over essentially the entire angular extent of rocking movement thereof between the engaged and disengaged conditions of said contact means, and means for rocking said plate.

2. In a switch assembly, stationary contact means, a movable contact member in the form of a generally flat plate having movable contact means attached to a side thereof, means mounting said plate for bodily sideways rocking movement about an axis essentially contained in the general plane of said plate for engagement and disengagement of said movable contact member with said stationary contact means, said mounting means comprising a mounting base, at least one slot formed in said base and a portion of said plate projecting into said slot, said slot having a restricted region receiving said plate portion with relatively low clearance therein and side surfaces tapering away from said restricted region so as to define clearance space for angular rocking movement of said plate, whereby said plate is not subjected to substantially any flexional constraint from said mounting means over essentially the full angular extent of rocking movement thereof between the engaged and disengagement conditions of said contact means, and means for rocking said plate.

3. The switch assembly claimed in claim 2, wherein said plate portion comprises a projection of said plate extending in the general plane thereof and defining a shoulder surface on said plate parallel to said rocking axis abuttingly engaging a cooperating surface of said base during said rocking movements.

4. The switch assembly claimed in claim 2, wherein there are two aligned slots in said base spaced along said rocking axis and wherein said plate portion comprises a pair of projections of said plate in the general plane thereof and spaced for engagement into said respective slots, said projections defining therebetween a shoulder surface parallel to said rocking axis for abutting engagement with a cooperating surface of said base during said rocking movements.

5. The switch assembly claimed in claim 1, wherein said plate rocking means comprise a cam engaging a side of said plate for rocking it in one direction and spring means urging the plate in the other direction.

6. The switch assembly claimed in claim 1, wherein said plate comprises an undulating configuration.

7. The switch assembly claimed in claim 1, including means interposed between said cam and said plate guided for sliding displacement relative to said base structure in directions towards and away from said plate normally to the plane thereof, said interposed means being engaged by said cam means on the inner side thereof to be cammed outwards for rocking said plate in said one direction.

8. In a dual switch assembly, stationary contact means, a pair of ganged movable contact members in the form of parallel spaced, generally flat plates having movable contact means attached to sides thereof, means mounting said plates for ganged, bodily sideways rocking movement about axes essentially contained in the respective planes of said plates for engagement and disengagement of said movable contact members with said stationary contact means, said mounting means comprising a base structure, slots formed in said base structure and portions of the respective plates projecting into said slots, each of said slots having a restricted region receiving said plate portion with relatively low clearance therein and side surfaces tapering away from said restricted regions so as to define clearance spaces for angular rocking movement of said plates, rotatable cam means positioned between said plates and operable for rocking both plates in one direction, spring means biassing the plates in the opposite direction, a pair of members interposed between said cam means and each of said plates and having leg portions guided for sliding displacement in grooves of said base structure in directions towards and away from said plates normally to the planes thereof, said members having inner surfaces engaged by said cam means to be cammed outwards for rocking said plates in said one direction.

9. A switch assembly comprising a plurality of generally similar switching stages, each stage comprising a generally flat casing, stationary contact means supported in the casing, a movable contact member in the form of a generally flat plate having movable contact means attached to a side thereof, means mounting said plate for bodily sideways rocking movement about an axis essentially contained in the plane of the plate for engagement and disengagement of said movable contact member with said stationary contact means, said mounting means comprising at least one slot in said casing and a portion of said plate projecting into said slot, said slot having a restricted region receiving said plate portion with the sides of said slot in linear engagement with the opposite sides of said plate adjacent said axis whereby to impose no substantial flexional constrant on said plate throughout essentially the full angular extent of rocking movement thereof between the engaged and disengaged conditions of said contact means, cam means rotatable in said casing and engageable with said plate for rocking the plate in one direction and spring means biassing the plate in the opposite direction, said casings being assembled with all the switching stages in stacked relationship with the cam means thereof coaxially aligned, and common shafting extending through all the casings and having said cam means mounted thereon for rotation thereof.

10. The switch assembly claimed in claim 9, including separator members of insulating material interposed between said switching stages, each separator member having a recess formed therein and a perforation centrally thereof, said shafting extending through said perforations in said separator members, and setting mechanism positioned in the recess of a separator member for yieldingly latching said shafting in a number of presettable angular positions to determine a number of corresponding yielding latched positions for the cam means of a corresponding adjacent switching stage.

11. A switch assembly comprising a plurality of generally similar switching stages, each stage comprising a generally flat casing, stationary contact means in the casing, movable contact means in the casing engageable with the stationary contact means, cam means rotatable in the casing and operatively connected for actuating said movable contact means to a number of predeterminable positions of engagement and disengagement with respect to said stationary contact means, recessed insulating separator members interposed between adjacent casings, said switching stage casings and separators being assembled in stacked relationship with said cam means coaxially aligned, common shafting extending through all the casings and separators and having said cam means mounted thereon for rotation thereof, setting mechanisms positioned in the recesses of the separator members for yieldingly latching said shafting in a number of presettable angular positions to determine corresponding yielding settings for the cam means of related adjacent switching stages, a setting mechanism comprising a polygonal camming member rotatable with said shafting within said separator recess, leaf spring means yieldably engageable with portions of said polygonal surface and fixedly connected with the walls of said separator recess, means interposed between said polygonal camming member and said leaf spring means and guided for sliding displacement relative to said separator member in directions generally normal to said leaf spring means.

References Cited by the Examiner

UNITED STATES PATENTS

| | | | |
|---|---|---|---|
| 2,068,713 | 1/37 | Schellenger | 200—6 X |
| 2,604,792 | 7/52 | Jeffrey | 200—6 X |
| 2,644,062 | 6/53 | Williams | 200—6 X |
| 2,978,555 | 4/61 | Jones | 200—67 |

FOREIGN PATENTS

| | | |
|---|---|---|
| 1,209,461 | 9/59 | France. |
| 591,124 | 1/34 | Germany. |
| 718,316 | 11/54 | Great Britain. |

OTHER REFERENCES

German application 1,051,357, Feb. 26, 1959 (1 sht. dwg.—4 pp. spec.).

BERNARD A. GILHEANY, *Primary Examiner.*